United States Patent [19]
Patterson et al.

[11] Patent Number: 5,867,877
[45] Date of Patent: Feb. 9, 1999

[54] SELF-RELEASING COUPLER

[75] Inventors: Gregory S. Patterson, Morrisville, N.C.; Mark Welsh, West Palm Beach, Fla.

[73] Assignee: Turtle Snaps, Inc., Palm Beach Gardens, Fla.

[21] Appl. No.: 911,665

[22] Filed: Aug. 15, 1997

[51] Int. Cl.$^6$ .................................................. A44B 21/00
[52] U.S. Cl. ........................ 24/598.5; 24/517; 24/600.7; 24/602
[58] Field of Search .................................. 24/598.5, 602, 24/599.4, 599.5, 599.7, 600.2, 601.5, 115 F

[56] References Cited

U.S. PATENT DOCUMENTS

| | | | |
|---|---|---|---|
| 1,262,974 | 4/1918 | Pearen ..................................... | 24/598.5 |
| 1,299,821 | 4/1919 | Carpmill et al. ....................... | 24/598.5 |
| 1,684,322 | 9/1928 | Itjen ........................................ | 24/598.5 |
| 3,235,928 | 2/1966 | Clark ....................................... | 24/517 |
| 3,540,089 | 11/1970 | Franklin .................................. | 24/602 |
| 3,952,382 | 4/1976 | Vaage .................................... | 24/600.7 |
| 4,315,424 | 2/1982 | Jarman et al. .......................... | 24/525 |
| 4,733,625 | 3/1988 | Allen ....................................... | 24/602 |
| 5,430,914 | 7/1995 | Patterson et al. ..................... | 24/598.5 |
| 5,606,782 | 3/1997 | Patterson et al. ..................... | 24/598.5 |

Primary Examiner—Victor N. Sakran
Attorney, Agent, or Firm—Rhodes, Coats & Bennett, L.L.P.

[57] ABSTRACT

A self-releasing or break-away coupler that releases in response to experiencing a predetermined load. The self-releasing coupler includes a pair of jaws that form a fastener. Surrounding the jaws is a sleeve housing that deforms in response to the predetermined load when applied to the jaws. That is, as the housing deforms, the jaws are allowed to open so as to release a fastener or connector secured within the jaws.

16 Claims, 5 Drawing Sheets

SELF-RELEASING COUPLER

FIELD OF THE INVENTION

The present invention relates to releasable fasteners or couplers and more particularly to a releasable fastener or coupler that is designed to release a connector therefrom in response to a predetermined load being applied to the fastener or coupler.

BACKGROUND OF THE INVENTION

Releasable fasteners or couplers are used in a wide variety of fields today. Basically, they act as an interconnector between two points and when subjected to a predetermined load these releasable fasteners effectively open, thereby dissipating the load on the fastener and freeing any object or thing that is connected thereto.

These types of break-away fasteners have long been used in the equestrian field. See for example, the disclosures found in U.S. Pat. Nos. 5,430,914 and 5,606,782, the disclosures of which are expressly incorporated herein by reference. Typically, such fasteners form a part of a tether that connects a horse to a post, trailer or fixed structure. Horses when tied to a fixed post or structure, can become agitated or frightened and will attempt to break away from the post or other fixed post or structure. Unless the tether holding the horse has some break-away feature, the horse could very well injure itself or a bystander or in some cases, actually damage adjacent property. Thus, it has been common to place a releasable snap or fastener in the tethered line. Such releasable snaps are designed such that once the horse exerts a predetermined load on the fastener, the fastener will release and the horse is able to break away without injuring itself.

However, releasable snaps or fasteners have in the past tended to be overly complicated and as such have been expensive to manufacture. Thus, in the end, the cost to consumers has been relatively high. Therefore, there is and continues to be a need for a practical, reliable and economical break-away fastener that can be used in a variety of fields, especially in the equestrian field, to tie or couple a horse to a post or other type of fixed structure.

SUMMARY OF THE INVENTION

The present invention entails a self-releasing snap (sometimes herein referred to as a break-away coupler or fastener) that is relatively simple in design and consequently can be manufactured economically. Generally, the self-releasing snap comprises a housing that at least partially encompasses a pair of cooperating jaws that typically connect to a connector such as a rope, pin or the like. The jaws are movable between a closed position and an open position. In the closed position, the jaws confine and hold the connector. In an open position, the jaws permit the connector to be released therefrom.

The portion of the housing surrounding the jaws is designed such as to generally confine the jaws in a closed position and to prevent the jaws from freely opening. However, the housing portion that surrounds the jaws functions to deform in response to a selected load being applied to the jaws, thereby permitting the jaws to move from the closed position towards the open position. In addition, the jaws are particularly configured with respect to the housing portion such that once the housing portion has deformed a certain amount the angle of engagement between the jaws and the housing is such that the housing will be pushed or moved generally axially away from the jaws permitting the jaws to assume a fully open position and allowing the connector confined within the jaws to be released. Thus, the jaws, housing and releasable snap as a whole are designed such that the jaws automatically release in response to a predetermined load being applied to the jaws. It follows that if the applied load is less than the predetermined load, that the housing generally confines the jaws and prevents them from opening to such an extent that a connector confined therein could be released.

In one particular embodiment, the housing assumes a sleeve form and a receiver is movably mounted in the end of the sleeve opposite the pair of jaws. The receiver is connected to the pair of jaws and a spring is interposed between the receiver and the sleeve and acts to bias both the pair of jaws and the receiver towards the end of the sleeve opposite the pair of jaws.

It is therefore an object of the present invention to provide a self-releasing snap or break-away coupler that is reliable, relatively simple in design, and which can be manufactured economically.

Other objects and advantages of the present invention will become apparent and obvious from a study of the following description and the accompanying drawings which are merely illustrative of such invention.

DESCRIPTION OF THE INVENTION

Figure 1:
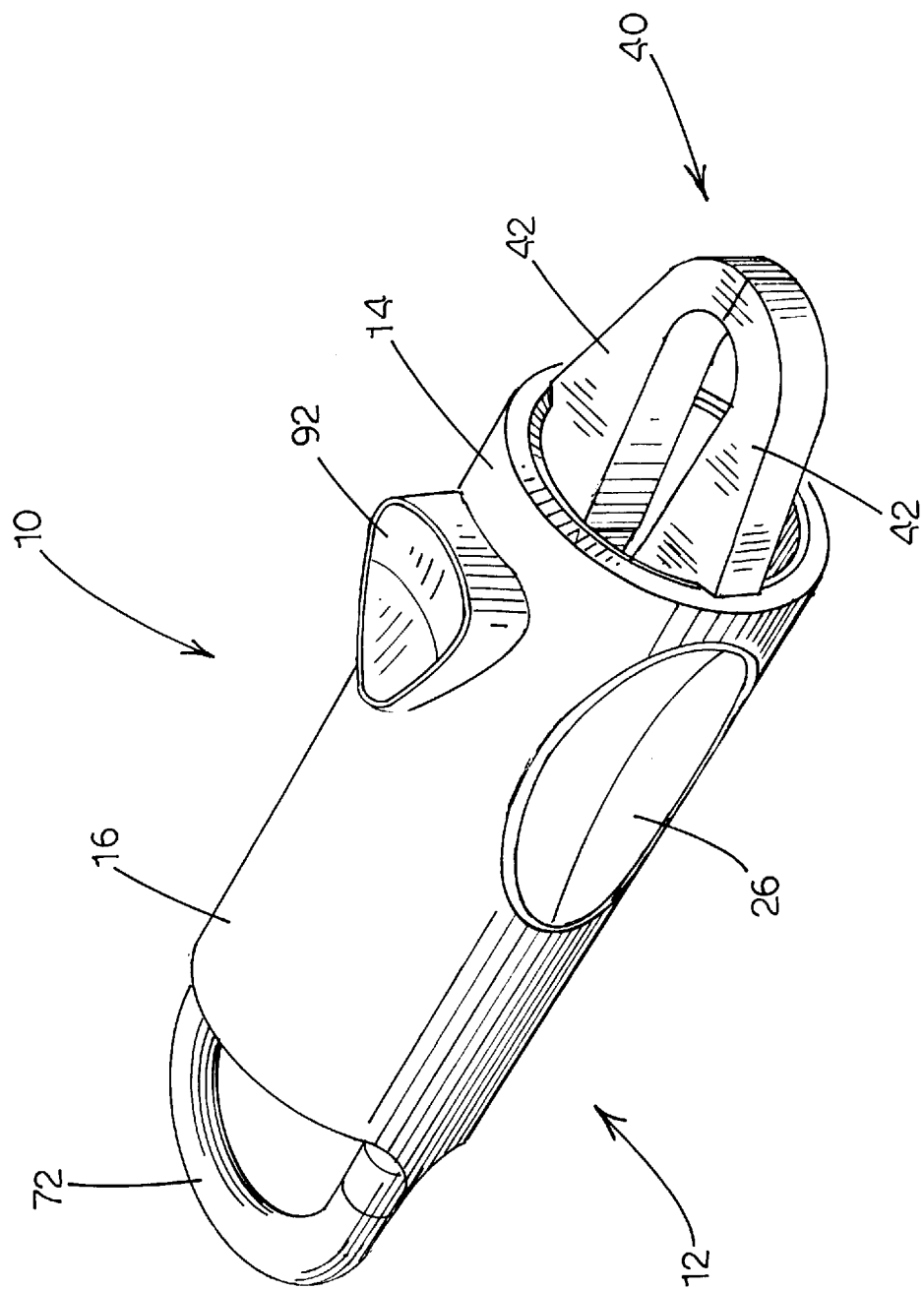
FIG. 1 is a perspective view of the self-releasing snap of the present invention.
Figure 2:
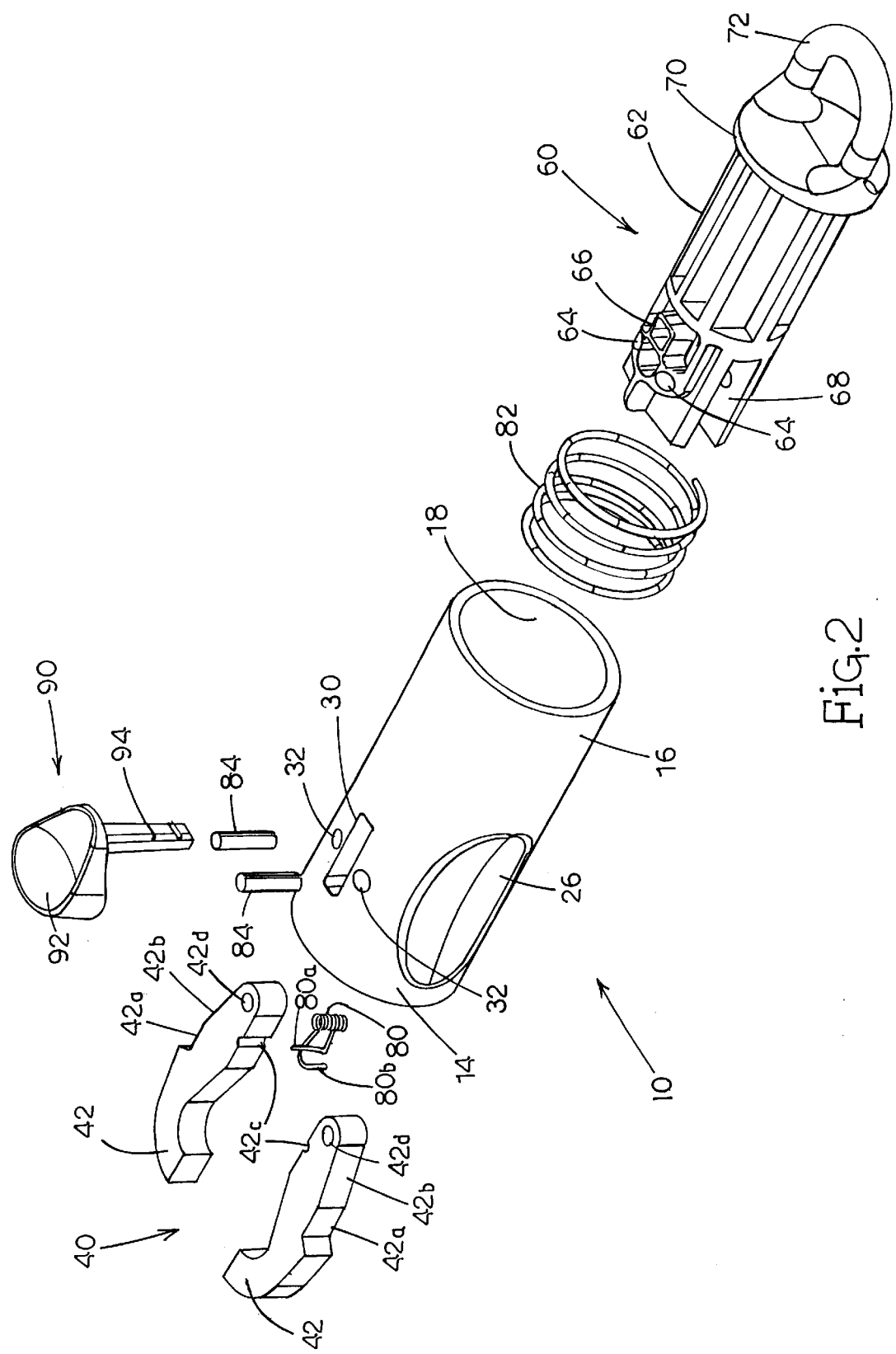
FIG. 2 is a perspective exploded view of the self-releasing snap.

According to the present invention, a self-releasing snap or break-away coupler is shown in FIGS. 1–7 and indicated generally by the numeral 10 therein. The break-away coupler 10 comprises a generally cylindrical or sleeve housing indicated generally by the numeral 12. The sleeve housing 12 includes a first end portion 14 and a second end portion 16. An elongated throughway 18 is formed through the sleeve housing 12. As particularly shown in FIGS. 3 and 4, there is an internal spring stop flange 24 formed intermediately around the inner wall of the housing 12. Formed internally about the first end portion 14 of the housing 12 is a pair of relatively short jaw slots 28. The opposed jaw slots 28 function to receive a portion of a pair of jaws to be hereinafter described in more detail. Extending through a portion of the housing 12 is an elongated slot 30. Disposed on each side of the slot 30 is a pin opening 32. Both the elongated slot 30 and the pin opening 32 extend completely through the wall of housing 12 (FIG. 2).

Formed about the outside of the sleeve housing 12 is a pair of side indentions 26. The side indentions 26 assist in gripping and handling the break-away coupler 10.

Figure 7:
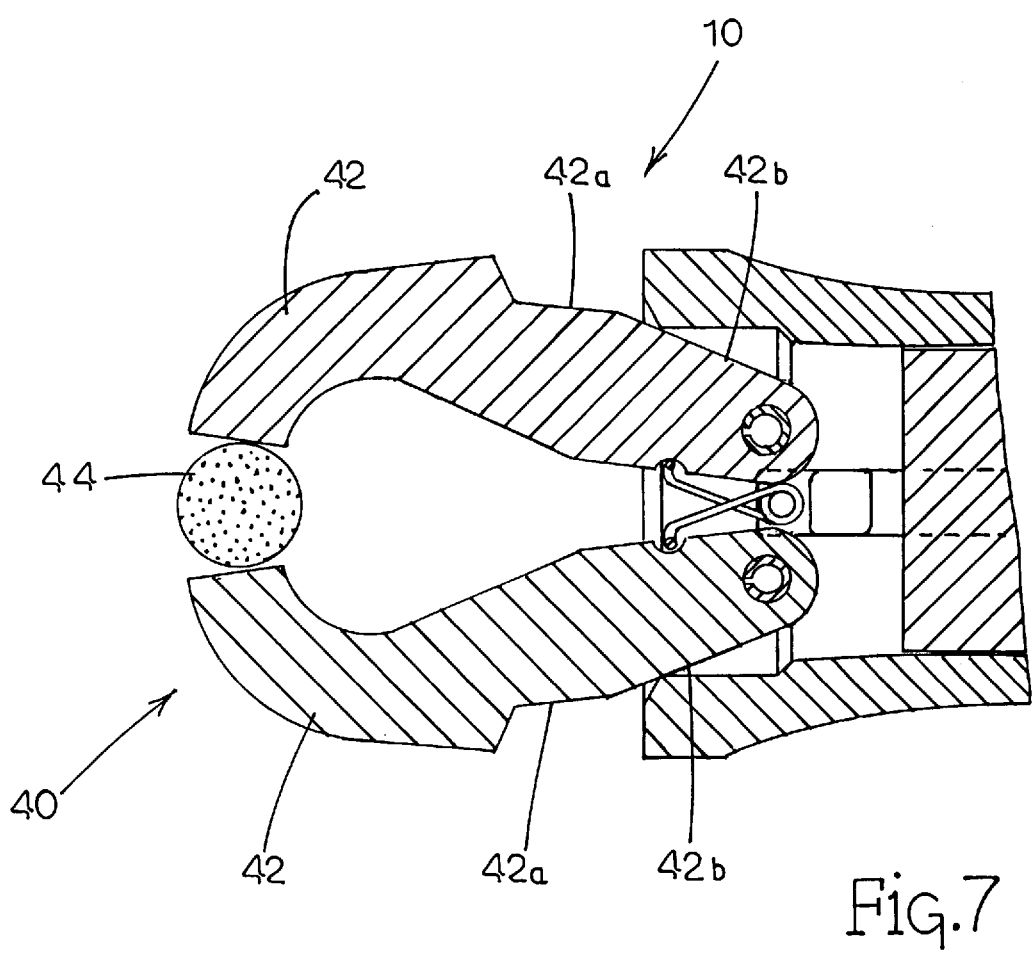

Secured within the first end portion 14 of the housing 12 is a jaw assembly indicated generally by the numeral 40. Jaw assembly 40 includes a pair of cooperating jaws 42 that are movable between a retracted closed position (FIG. 3) and an extended fully open position (FIG. 7). Each jaw 42 includes an outer edge or shoulder structure (sometimes referred to as an outer surface) that lies adjacent the internal wall of the first end portion 14 of the housing 12. More particularly, this outer edge or shoulder structure includes a pair of continuous shoulder portions 42a and 42b that are generally delineated by an angle break. That is, the shoulder portions 42a and 42b of each jaw 42 is not linear but the two shoulder portions are slightly angled with respect to each other. In any event, when the jaws 42 assume the retracted closed position, the forward most shoulder portion 42a generally lies in the jaw slots 28 formed in the first end portion 14 of the housing 12. Further, about the inner terminal end of each jaw 42 there is formed a pin aperture opening 42d. Also, formed about the inside of each jaw 42 near the inner terminal end is a spring seat groove 42c that is adapted to receive a portion of a torsion spring to be hereafter described.

Jaw assembly 40 is retained within the sleeve housing 12 by a receiver indicated generally by the numeral 60. More particularly, receiver 60 is movably contained within the sleeve 12 about the second end portion 16. Viewing receiver 60 in more detail, as particularly illustrated in FIG. 2, it is seen that the same includes a main body 62. Formed about the outboard end of the main body is a connector ring 72. Viewing the inboard end of the receiver 60, it is seen that the same includes a pair of pin apertures 64 and a stem aperture 66. Formed about the inboard end of the receiver is a jaw cavity 68 that is designed to receive the inner terminal ends of the jaws 42. Also formed about the outboard end of the receiver 60 is a spring stop flange 70 that is adapted to engage a coil spring contained within the sleeve housing 12.

To secure the receiver 60 to the jaw assembly 40, there is provided a pair of connecting pins 84 (FIG. 2). Connecting pins 84 are inserted downwardly through the pin openings 32 formed in the housing 12 and on downwardly through the pin apertures 64 formed in the receiver 60. As the connecting pins 84 are pushed on downwardly, they are inserted through the pin aperture openings 42d formed in the inner terminal ends of the respective jaws 42. Consequently, the jaws are secured directly to the receiver 60 but because of the connecting pins 84, the respective jaws 42 are permitted to rotate about the pins 84.

A torsion spring 80 is set between the jaws 42 and supported about the inboard end of the receiver 60 within the jaw cavity 68. Torsion spring 80 includes a pair of spring arms 80a and 80b. These spring arms engage the respective grooves 42c formed along the inside edges of the jaws. Consequently, the torsion spring 80 tends to bias the jaws 42 towards an open position.

Figure 3:
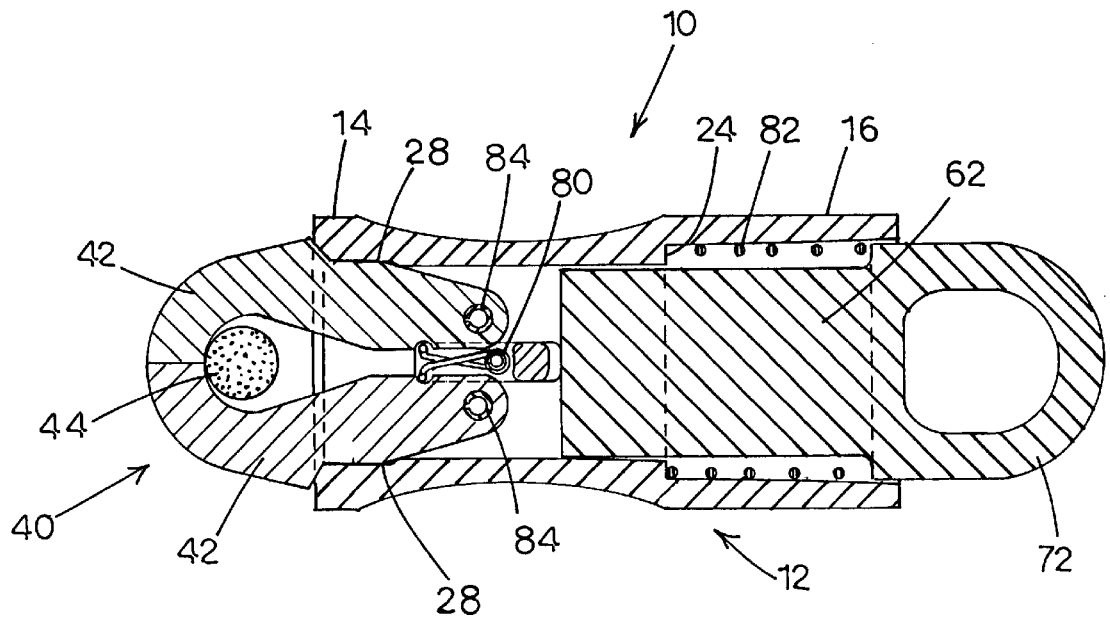
FIG. 3 is a longitudinal sectional view of the self-releasing snap showing the jaws in a retracted closed position.
Figure 4:
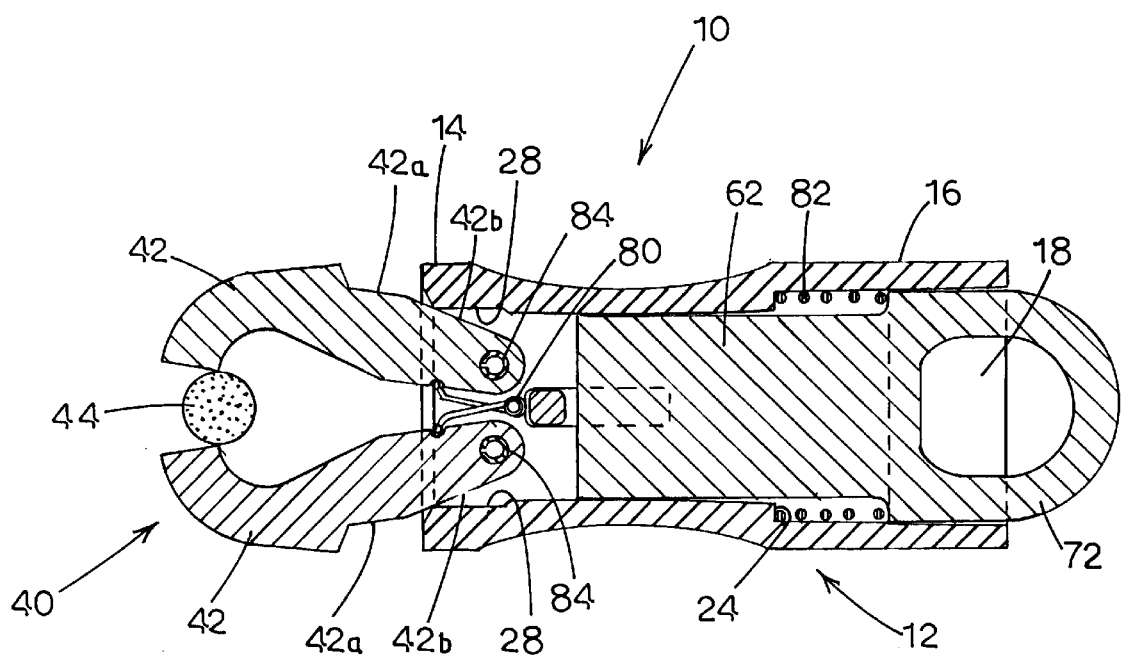
FIG. 4 is a view similar to FIG. 3 except that the jaws are partially open.

Interposed between the sleeve housing 12 and the receiver 60 is a compression spring 82. Note in FIGS. 3 and 4 that the compression spring is interposed such that it extends between the spring stop flange 24 formed in the housing 12 and the spring stop flange 70 formed about the outboard end of the receiver 60. The compression spring 82 biases both the jaw assembly 40 and the receiver 60 from left to right as shown in FIGS. 3 and 4. In fact, the biasing action of the spring 82 biases the jaws 42 to their retracted and closed position illustrated in FIGS. 3 and 5.

Disposed about the outside of the sleeve housing 12 is a manual actuator indicated generally by the numeral 90. The manual actuator 90 includes a thumb rest 92 that sets adjacent the sleeve. Thumb rest 92 includes a stem 94 that projects downwardly through the elongated slot 30 formed in the housing 12 and seats into the stem aperture 66 formed in the receiver 60. The stem 94 can be constructed such that it includes one or more grooves that when inserted into the stem aperture 66 forms a connection that effectively connects the manual actuator 90 to the receiver 60. Consequently, by moving the thumb rest 92 back and forth, the jaws 42 can be manually moved between closed and open positions.

The jaw assembly 40 is designed to be coupled to a connector indicated in FIGS. 3–7 by the numeral 44. Connector 44 could obviously be a rope, pin or other connecting structure. As discussed herein before, the break-away coupler 10 of the present invention is designed such that the jaws 42 automatically release or open in response to a predetermined load being applied to them through such a connector. That is, the jaw assembly 40 and the sleeve housing are designed to generally maintain the jaws 42 closed so as to retain and confine the connector 44 until a predetermined load is applied to the jaws.

Basically, the portion of the housing 12 surrounding the jaw assembly 40 is designed to resist the opening of the jaws 42. However, the first end portion 14 of the housing is designed to slightly deform in response to the jaws exerting a certain level of force against the adjacent housing. More particularly, the jaw assembly 40 and housing is designed such that once the housing has deformed to such a degree that the lateral forces being carried by the jaws 42 will have a sufficient axial or rearward component that will effectively overcome the force of the compression spring 82 and cause the housing to move left to right as viewed in FIGS. 3–7.

Figure 5:
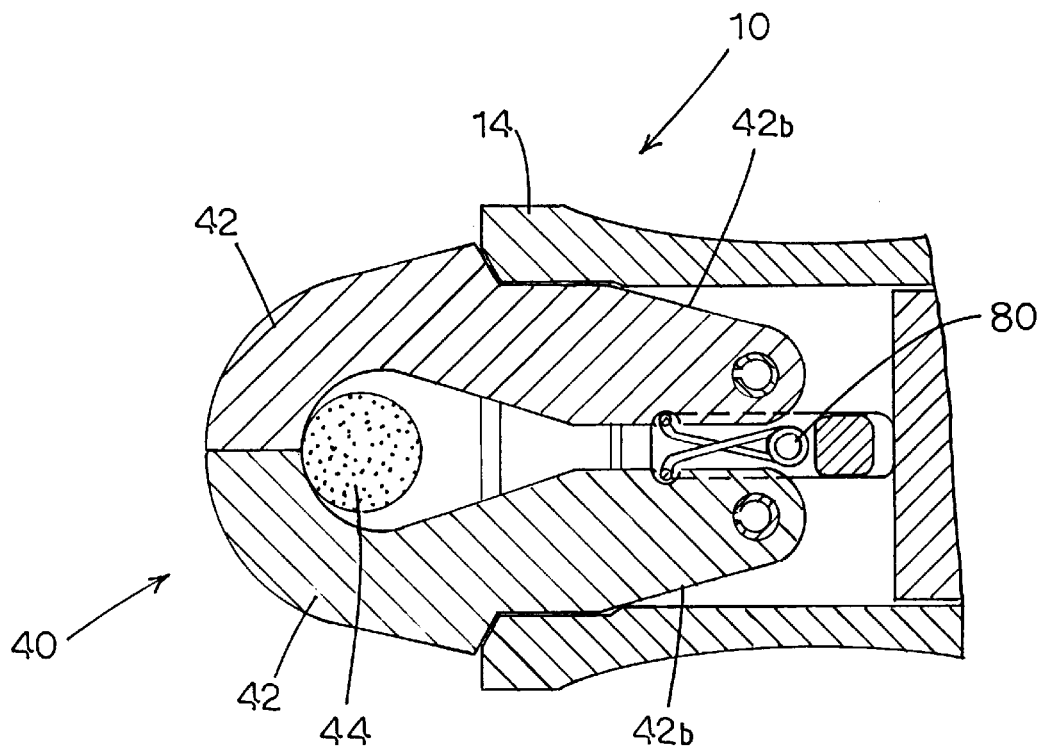
FIGS. 5–7 are a sequence of views illustrating the movement of the jaws from the retracted closed position to the extended open position.
Figure 6:
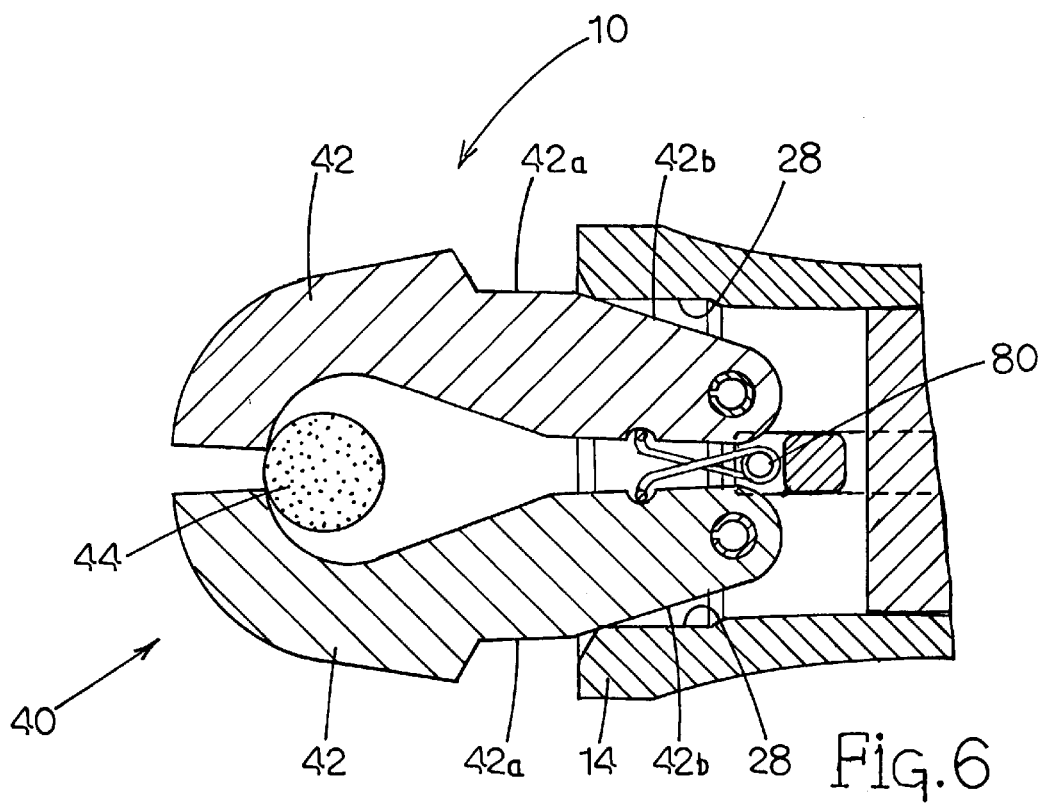

Viewing this feature of the design in more detail, it is seen that a load is applied to the jaw assembly 40 by the connector 44 being pulled right to left as viewed in FIGS. 3–7. The internal edges of the jaws 42 that engage the connector 44 are particularly designed such that an axial force experienced by the connector 44 in a direction opposite from the receiver 60 will result in a lateral load being applied to the jaws causing the jaws to have a tendency to open. However, so long as the load does not exceed a pre-selected or predetermined threshold load, the housing 14 surrounding the jaws 42 will retain the jaws in a closed or partially closed position. However, once the load on the connector 44 closely approaches or exceeds the threshold or predetermined load, then the first end portion 14 of the housing 12 will begin to slightly deform. This is illustrated in FIGS. 5–6. As the housing starts to deform, the angled configuration of the forward shoulder portions 42a will begin to exert, in a progressive fashion, more axial force in the direction of the receiver 60. Thus, after a certain degree of deformation, the shoulder portions 42a and 42b of the jaws will act to essentially push the entire housing 12 left to right as viewed in FIGS. 5–7. As shown in FIG. 7, once the housing 12 has been sufficiently pushed left to right, then the jaws 42 are free to spring open and the connector 44 can escape from the confines of the jaws 42.

It should be noted that the jaws 42 may be opened by simply engaging the housing 12 and pushing the housing 12 left to right as viewed in FIG. 3. The movement of the housing in this manner automatically opens the jaws 42.

Therefore, based on the above discussion and the drawings, it is appreciated that there are several designs factors which influence the break-away or threshold force required in order to cause the self-releasing snap 10 to automatically release. These factors include, not necessarily in order of importance, the mechanical properties of the housing 12, the structural properties of the housing, the overall contour or shape of the shoulder region 42a, 42b of the jaw members, the overall contour or shape of the interior edges of the jaws that engage the connector 44, and the spring constant of the compression spring 82. With regard to the structural and material properties of the housing 12, it follows that a more easily deformable housing 12 would lead to a generally lower break-away or threshold force value, as less force would be required to deform the housing to its final, open state. Housing deformability and hence break-away threshold can be varied through either structural or material property design alterations.

The housing 12 and other components of the releasable snap 10 can be constructed of various materials. In the way of examples, the housing could be made from a number of materials including PVC/ABS or PC/ABS. The receiver 60 and the jaw assembly 40 could be fabricated from glass filled nylon 6/6 and stainless steel, respectively.

From the foregoing specification and discussion, it is appreciated that the self-releasing snap or break-away coupler 10 of the present invention can be used in conjunction with securing horses, other animals and objects to a fixed post or other fixed structure. Moreover, the design of the self-releasing snap 10 of the present invention assures that the snap is reliable, simple in design and capable of being manufactured economically.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A break-away coupler comprising:
   a) a housing having an open end portion;
   b) a pair of jaws disposed within the open end portion of the housing, the jaws being movable between a closed and opened position; and
   c) wherein the open end portion of the housing surrounds the pair of jaws and generally prevents the jaws from freely opening but wherein the open end of the housing is deformable in response to a certain load being applied to the jaws and the jaws engaging the housing and deforming the housing as they move from the closed position towards the open position and wherein the deformed housing permits the jaws to assume an open position such that a connector member held within the jaws is free to break-away from the jaws.

2. The break-away coupler of claim 1 wherein the jaws include an outer surface for engaging the open end portion of the housing and wherein the outer surface of the jaws is configured so as to engage the open end portion of the housing and to deform the same as the jaws move from the closed position towards the open position and wherein the configuration of the outer surface of the jaws is such that the jaws engage and urge the housing axially relative the jaws as the jaws move from the closed position towards the open position.

3. The break-away coupler of claim 1 including a receiver movably contained within the housing and connected to the pair of jaws.

4. The break-away coupler of claim 3 wherein the housing is in the general form of a sleeve that is at least partially open.

5. The break-away coupler of claim 3 including a manual actuator secured to the receiver for manually moving the jaws from the closed position to the open position.

6. The break-away coupler of claim 3 wherein there is provided a biasing member interposed between the housing and the receiver for biasing the jaws towards a closed retracted position.

7. The break-away coupler of claim 6 wherein the biasing member includes a spring.

8. The break-away coupler of claim 1 wherein the jaws are adapted to receive a connecting member and the deformable open end portion of the housing is adapted to maintain the jaws sufficiently closed to retain the connecting member therein until a predetermined load is applied to the jaws by the connecting member at which time the open end portion of the housing deforms to permit the jaws to open to such an extent that the connecting member is permitted to break away from the jaws.

9. The break-away coupler of claim 1 wherein the housing includes at least one indented gripping surface formed therein.

10. The break-away coupler of claim 9 including a manual actuator movable back and forth on the housing for manually moving the pair of jaws between open and closed positions, and wherein the housing includes a pair of indented gripping surfaces formed therein on opposite sides of the manual actuator.

11. A break-away coupler for attaching to a connector and permitting the connector to break away from the coupler in response to a certain amount of force being applied to the connector relative to the coupler, the break-away coupler comprising:
    a) an elongated sleeve housing including first and second end portions;
    b) a pair of cooperating jaws disposed in the first end portion of the sleeve housing and movable between closed and open positions, the jaws when closed adapted to receive and hold the connector therein;
    c) each jaw including an outer surface that is disposed adjacent the first end portion of the sleeve housing when the jaws assume a closed position;
    d) the first end portion of the sleeve housing generally surrounding the jaws when the jaws assume the closed position so as to prevent the jaws from freely opening, and wherein the first end portion of the sleeve housing is deformable in response to the jaws moving outwardly from the closed position towards the open position due to a force being applied to the jaws through the connector; and
    e) wherein the connector opens the jaws and breaks away therefrom in response to a lateral force applied by the jaws to the first open end portion causing the first open end portion to deform such that the jaws may open and release the connector therefrom.

12. The break-away coupler of claim 11 wherein the jaws are axially movable within the sleeve housing between a retracted closed position and an extended open position and wherein the jaws are biased to assume the retracted closed position.

13. The break-away coupler of claim 12 wherein the jaws are configured so as to urge the first end portion of the sleeve housing axially away from the jaws after the first end portion has experienced some degree of deformation, thereby effectively moving the sleeve housing relative to the jaws and permitting the jaws to move to a full open position.

14. The break-away coupler of claim 13 including a receiver disposed in the second end portion of the sleeve housing and connected to the pair of jaws, and a spring interposed between the receiver and the housing for biasing the jaws towards the retracted closed position.

15. The break-away coupler of claim 14 wherein as the jaws move from the closed position towards the open position, the outer surface of the jaws exert an outward and lateral force against the first end portion of the sleeve housing causing that portion of the sleeve housing to deform and wherein as the jaws continue to move outwardly after there has been some degree of deformation, the outer surface of the jaws are so configured such that they exert a force against the sleeve housing that is generally parallel with the axis of the sleeve housing and this parallel force overcomes the force of the spring causing the sleeve housing to move axially away from the jaws.

16. The break-away coupler of claim 11 including a movable actuator disposed exteriorly of the sleeve housing and connected to the receiver such that the back and forth movement of the actuator results in the jaws being moved back and forth between the retracted closed position and the extended open position.

* * * * *